US007617173B2

(12) United States Patent
Nambudiri

(10) Patent No.: US 7,617,173 B2
(45) Date of Patent: Nov. 10, 2009

(54) METHOD AND SYSTEM FOR IMPROVING SECURITY OF POSTAGE INDICIA UTILIZING RESOLUTION AND PIXEL SIZE

(75) Inventor: Easwaran Nambudiri, Rye Brook, NY (US)

(73) Assignee: Pitney Bowes Inc., Stamford, CT (US)

( * ) Notice: Subject to any disclaimer, the term of this patent is extended or adjusted under 35 U.S.C. 154(b) by 1219 days.

(21) Appl. No.: 10/695,539

(22) Filed: Oct. 28, 2003

(65) Prior Publication Data

US 2005/0091170 A1 Apr. 28, 2005

(51) Int. Cl.
*G06F 15/00* (2006.01)
*G06F 15/18* (2006.01)

(52) U.S. Cl. ......................... 706/62; 382/177; 382/101; 382/181

(58) Field of Classification Search ................... 706/62; 380/51, 54, 55; 705/62
See application file for complete search history.

(56) References Cited

U.S. PATENT DOCUMENTS

| | | | | |
|---|---|---|---|---|
| 5,611,630 | A * | 3/1997 | Dolan et al. | 400/120.09 |
| 6,776,544 | B2 | 8/2004 | Jauert | |
| 6,859,534 | B1 * | 2/2005 | Alasia | 380/51 |
| 2003/0005303 | A1 * | 1/2003 | Auslander et al. | 713/176 |

* cited by examiner

*Primary Examiner*—David R Vincent
*Assistant Examiner*—Kalpana Bharadwaj
(74) *Attorney, Agent, or Firm*—Brian A. Lemm; Angelo N. Chaclas

(57) ABSTRACT

The present invention includes methods for printing and verifying postage indicia. At least a portion of the indicia is printed with a resolution characteristic that may be changed from indicium to indicium. Each indicium includes data that indicates the resolution used to print the indicium or indicium portion.

18 Claims, 10 Drawing Sheets

SOURCE IMAGE BIT MAP = PRINTED IMAGE

SOURCE IMAGE BIT MAP (S)

PRINTED IMAGE (P) H2V2 RESOLUTION

SOURCE IMAGE BIT MAP

PRINTED IMAGE H1V2 RESOLUTION

SOURCE IMAGE BIT MAP

PRINTED IMAGE H2V1 RESOLUTION

METHOD AND SYSTEM FOR IMPROVING SECURITY OF POSTAGE INDICIA UTILIZING RESOLUTION AND PIXEL SIZE

BACKGROUND

This invention relates generally to the field of postal revenue protection, and more particularly to generating postage indicia in a manner that enhances opportunities to detect counterfeiting of postage indicia.

Postage meters are well known. An important aspect of any system that includes postage meters is protection of postal revenue and prevention and deterrence of postage indicia counterfeiting. While currently available systems generally operate satisfactorily in this regard, it would be desirable to provide a postage metering system which includes increased opportunities for detecting counterfeiting of postage indicia.

SUMMARY

Accordingly, apparatus and methods for generating and inspecting postage indicia are provided.

In one aspect, an apparatus includes a print element for printing an indicium on a substrate, where at least a portion of the indicium is printed with a first resolution. The apparatus further includes a control mechanism that is coupled to the print element to cause the print element to print at least one symbol as part of the indicium, where the at least one symbol includes resolution data that is indicative of the first resolution. (As used herein, "resolution" refers to a fineness of detail in a printed image.) The first resolution may include a horizontal resolution factor and a vertical resolution factor that is different from the horizontal resolution factor.

The control mechanism may cause the print element to print the resolution data in encrypted form. The at least one symbol that includes the resolution data may be at least part of a barcode such as a two-dimensional barcode.

The control mechanism may operate to select the first resolution in various ways, including a random or pseudo-random process. As used hereinafter, a "random process" refers to any process in which a degree of randomness or pseudo-randomness enters into selection of a resolution characteristic.

According to another aspect, a method includes examining an indicium to determine a first print resolution characteristic of at least a portion of the indicium, and reading at least one symbol included in the indicium to determine a second print resolution characteristic indicated by resolution data represented by the at least one symbol. The method further includes comparing the first print resolution characteristic with the second print resolution characteristic to determine whether the first print resolution characteristic matches the second print resolution characteristic.

The reading step may include reading a barcode that is part of the indicium. The barcode may be a two-dimensional barcode. The indicia may be postage indicia.

According to still another aspect, a method of printing a postage indicium by using a postage meter includes selecting a print resolution based on at least one of: (a) a calendar date, (b) a current day of the week, (c) a state or province in which the postage meter is located, (e) a current value of a register of the postage meter, and (f) a random process. The method further includes printing at least a portion of the postage indicium with the selected print resolution.

By printing postage indicia, or a portion thereof, with a resolution that may be changed from indicium to indicium (or, e.g., from batch to batch of mail pieces) and encoding in each indicium data that indicates the resolution employed for printing the indicium or portion of the indicium, the invention may make it more difficult to counterfeit postage indicia and may aid in inspection and verification of postage indicia.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention includes apparatus and methods for printing and verifying postage indicia. The indicia or a portion of the indicia may be printed in accordance with a particular resolution characteristic that may be changed from indicium to indicium, from one batch of mail pieces to another, or from one period of operating the postage indicia printing apparatus to another. Data is encoded into each indicium that indicates the resolution characteristic used to print the indicium or portion of the indicium. To verify the indicium, the indicium is examined, for example, by an optical magnification system, to detect the particular resolution characteristic, and the data encoded in the indicium concerning the resolution characteristic is read. The detected resolution characteristic is compared with the data to determine whether there is a match. If so, the authenticity of the indicium may be considered to be verified.

Figure 1:
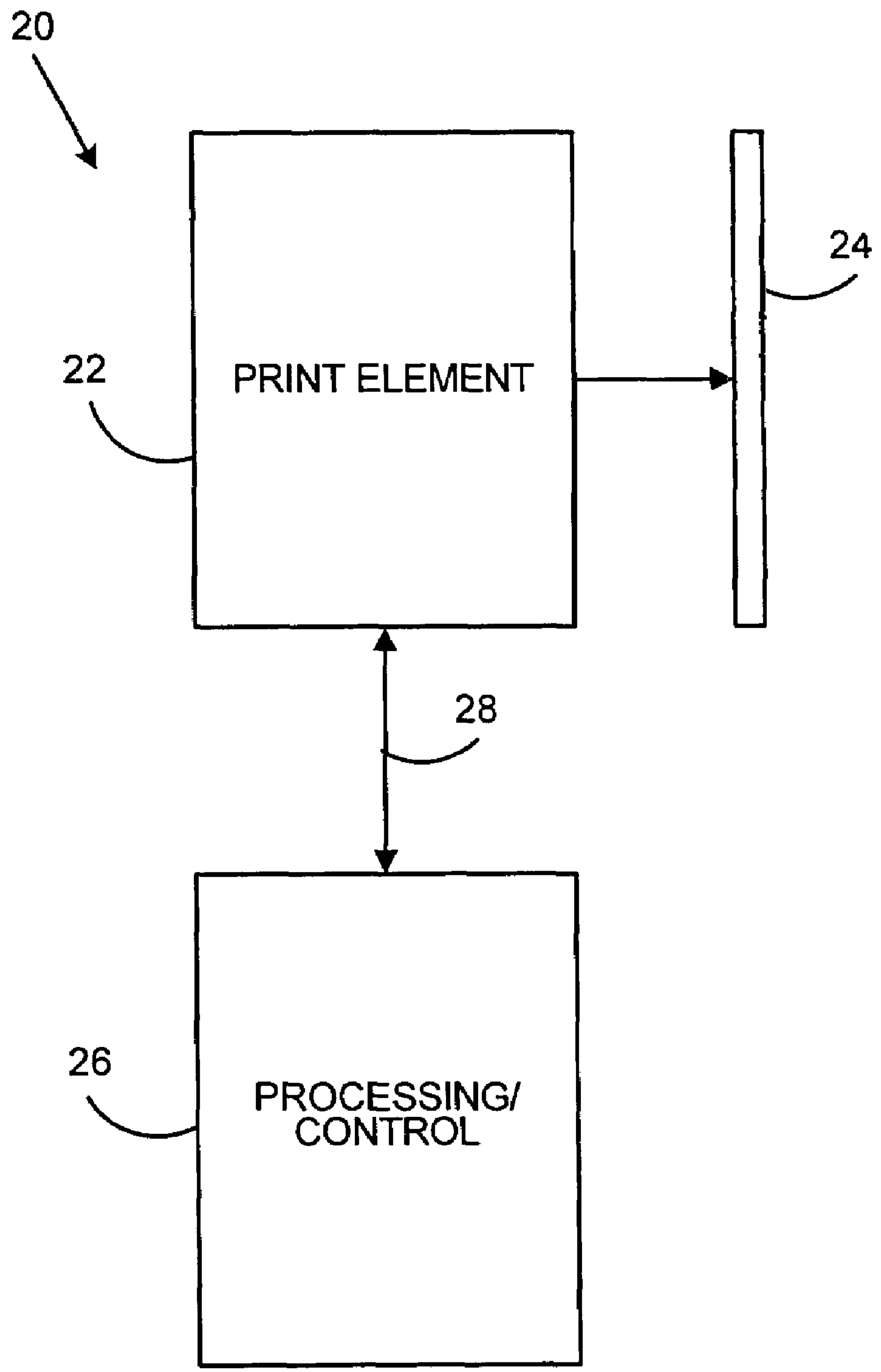
FIG. 1 is a block diagram that illustrates an indicia printing apparatus arranged in accordance with principles of the present invention.

Referring now to the drawings, and particularly to FIG. 1, the reference numeral 20 indicates generally an apparatus for printing postage indicia in accordance with principles of the present invention. The printing apparatus 20 includes a print element 22 that is configured to print indicia (not shown in FIG. 1) on mail pieces (e.g., an envelopes), labels or another type of substrate, indicated by reference numeral 24. In some embodiments, the print element 22 may be an ink jet or laser printer that is capable of printing text, images, and/or barcodes with a matrix of dots or pixels. In some embodiments, the print element 22 may be of a type conventionally employed as part of a postage meter system.

The printing apparatus 20 also includes a processing and control block 26, which is coupled to and controls the print element 22. The coupling of the processing and control block 26 to the print element 22 may be via a data channel 28. In accordance with conventional practices, the data channel 28 may be secured by encryption and/or decryption performed in the processing and control block 26 and/or the print element 22. The print element 22 may be implemented with two or more print elements. In some embodiments, hardware aspects of the processing and control block 26 may be constituted by conventional electronics used to control known types of postage meters, but programmed with software provided in accordance with principles of the present invention. (Program storage and working memory aspects of the processing and control block 26 are not separately shown.) In general, all hardware aspects of the postage indicia printing apparatus 20 may, in some embodiments, be constituted by a conventional postage metering system, but as noted above the processing/control block 26 may be programmed and operated in accordance with principles of the present invention. The postage indicia printing apparatus may be suitable for installation and operation with a conventional mailing machine, which is not shown.

Figure 2:
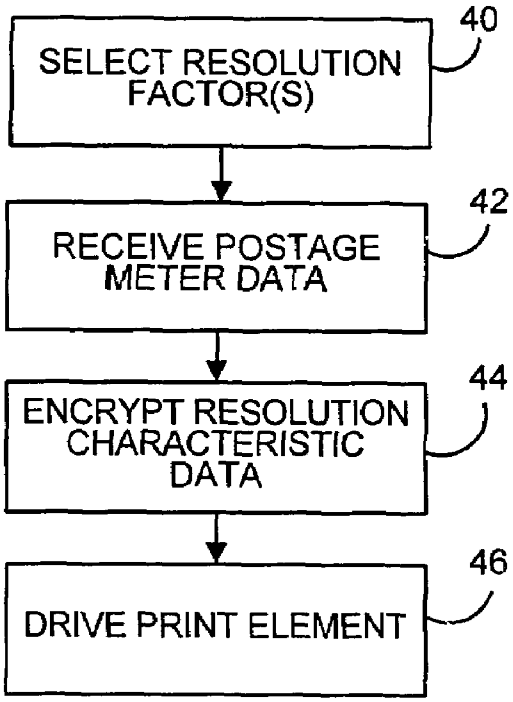
FIG. 2 is a flow chart that illustrates a process that may be performed by a processing/control component that is part of the apparatus of FIG. 1.

FIG. 2 is a flow chart that illustrates a process that may be performed by the processing and control block 26 of the printing apparatus 20. The process of FIG. 2 begins with a step 40 in which the processing and control block 26 selects a resolution characteristic to be employed in printing some or all of an indicium. The resolution characteristic may be represented, for example, by a horizontal resolution factor and a vertical resolution factor. For example, the print element 22 may be capable of printing with a certain maximum resolution (maximum dots per inch or dpi) in the horizontal and vertical directions. The maximum vertical resolution is limited by the size of the print head, while the maximum horizontal resolution is based upon the system design. The horizontal resolution factor may indicate a degree to which the actual horizontal resolution to be employed in printing the indicia or portion thereof is to be increased, whereas the vertical resolution factor may indicate a degree to which the actual vertical resolution to be employed in printing the indicia or indicia portion is to be increased.

The expression "HxVy" may be taken as an indication of a resolution characteristic of a printed image based on a source image bit map selected by the processing and control block 26, where "Hx" represents a horizontal resolution factor, i.e., transformation of each pixel in a horizontal direction, and "Vy" represents a vertical resolution factor, i.e., transformation of each pixel in a vertical direction. Thus, the expression "H1V1" indicates a resolution characteristic in which each pixel of the printed image corresponds to a pixel of the source image bit map. The expression "H2V1" indicates a resolution characteristic of the printed image in which the pixels in the horizontal direction are increased by a factor of two, while there is no change to the pixels of the source image in the vertical direction. The expression "H1V2" indicates a resolution characteristic of the printed image in which the pixels of the source image are increased in the vertical direction by a factor of two, while there is no change to the pixels in the horizontal direction. The expression "H2V2" indicates a resolution characteristic of the printed image in which each pixel is increased in both the horizontal and vertical direction by a factor of two.

In some embodiments, the postage indicia printing apparatus 20 may be programmed to select only from among the four resolution characteristics H1V1, H2V1, H1V2 and H2V2. In other embodiments, the horizontal and/or vertical resolutions may be varied by factors other than two, and the number of potential choices of resolution characteristics may be greater than four. In still other embodiments, the number of potential choices of resolution characteristics may be less than four. In addition, in some embodiments the number of potential choices of resolution characteristics may be four although the possible degree of increase of horizontal and/or vertical resolution may be other than by a factor of two.

In some embodiments, the resolution characteristic selection may be based on one or more of: the current date, the day of the week, the current month, the state or zip code of origin of the mail, a current postage meter register value (e.g., the last digit of the current value of the ascending meter register). In addition or alternatively, the selection of the resolution characteristic may be based at least in part on a command or data downloaded to the postage indicia printing apparatus 20 from a central data center upon recharging the postage indicia printing apparatus with postage.

In some other embodiments, the resolution characteristic may be based on a random or pseudo-random process. For example, the processing and control block 26 may include a random number generator (not separately shown), and on the basis of a random number generated by the random number generator, a look-up table (not separately shown) may be accessed to select a resolution characteristic indicated by an entry in the look-up table.

Following (or, alternatively, prior to) step 40 is a step 42 at which postage meter data, such as, for example, the ascending register value and postage amount, is received. As is well known to those who are skilled in the art, an ascending register value is a value that is conventionally stored in a postage meter to indicate the total amount of postage that has been dispensed by the postage meter. The ascending register value may be received, for example, by reading a register that may be maintained in a non-volatile memory (which is not separately shown). The postage amount may be set in a conventional manner, e.g., by manual input or by data received from a postage scale (not shown) which is interfaced to the printing apparatus 20. The receiving of the postage amount data may include, for example, either receiving manual input from a human operator or receiving postage amount data output from a postage scale.

Following steps 40 and 42 is a step 44 at which encrypted data is produced by an encryption process that includes the selected resolution characteristic, as well as other postage meter data, as inputs and is such that the resolution characteristic and the postage meter data can be recovered by decrypting the encrypted data.

Step 46 follows step 44. At step 46 the printing apparatus prints a postage indicium. In particular, the processing and control block 26 controls the print element 22 to print the indicium on the substrate 24. As will be seen, the encrypted resolution characteristic is included in the indicium in the form of one or more machine-readable symbols.

Figure 3:
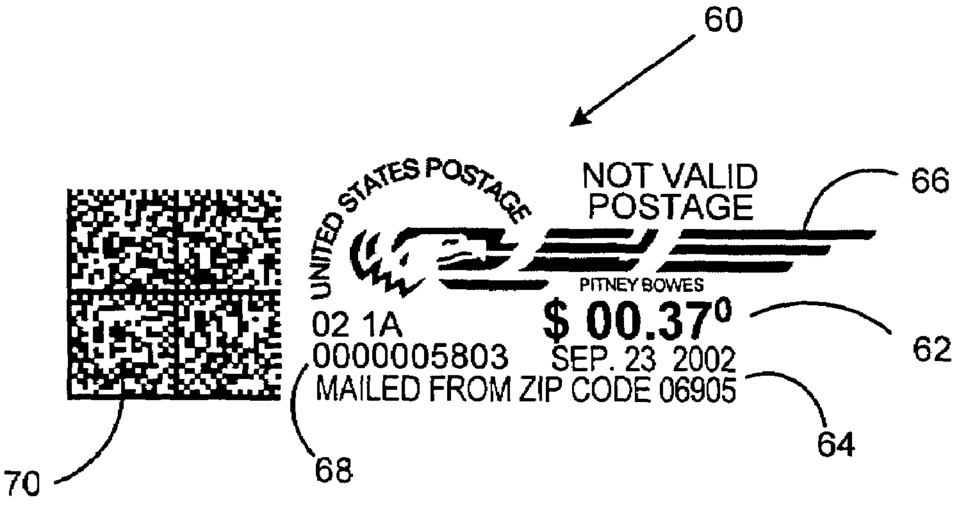
FIG. 3 is an illustration of a specimen postage indicium of a type that may be printed by the apparatus of FIG. 1.

FIG. 3 is an illustration of a specimen postage indicium 60 of a type that may be printed by the printing apparatus 20 (FIG. 1) at step 48 (FIG. 2). Referring to FIG. 3, the indicium 60 may include conventional elements such as a postage amount 62 (in human-readable numerals), a postmark 64 (including date and location of mailing) and a manufacturer's icon, logo or trademark 66. The indicium 60 may further include a meter serial number 68 in the form of human-readable numerals. The indicium 60 also includes a barcode 70 by which machine-readable data is presented. The data represented by the barcode 70 includes the encrypted resolution characteristic data that was referred to above in connection with step 44 (FIG. 2). Other data may be included in the barcode 70, such as machine-readable versions of the meter serial number and the postmark information and/or destination information such as the destination zip code. The indicium may generally be in compliance with the "Information-Based Indicia Program" (IBIP) promulgated by the U.S. Postal Service. The IBIP information may contain high-density variable cryptographically protected information in a two-dimensional barcode. The IBIP information may be used for security and marketing purposes and may include the encrypted resolution characteristic data referred to above. In compliance with the IBIP, the barcode may be based on the well known PDF417 standard or Data Matrix standard.

It will be appreciated that the barcode 70 constitutes machine readable symbols that include resolution characteristic data which indicate the resolution characteristic selected by the postage indicia printing apparatus 20 at step 40 in FIG. 2. In other embodiments, the resolution characteristic data may be presented by other types of symbols, which may or may not be machine-readable. For example, one-dimensional barcodes and/or alphanumeric characters may be employed to represent the resolution characteristic data as part of the indicium 60. It is not required that the resolution characteristic data be encrypted.

If the resolution characteristic data is printed in encrypted form, the encryption process need not include either or both of ascending register data and postage amount data as inputs, and/or may include some or all of other data such as calendar date data, meter serial number data, address data, and so forth.

There will now be described, with reference to FIGS. 4-10, simplified examples of images that may be printed as part of the indicium 60 in accordance with various resolution characteristics.

Figure 4:
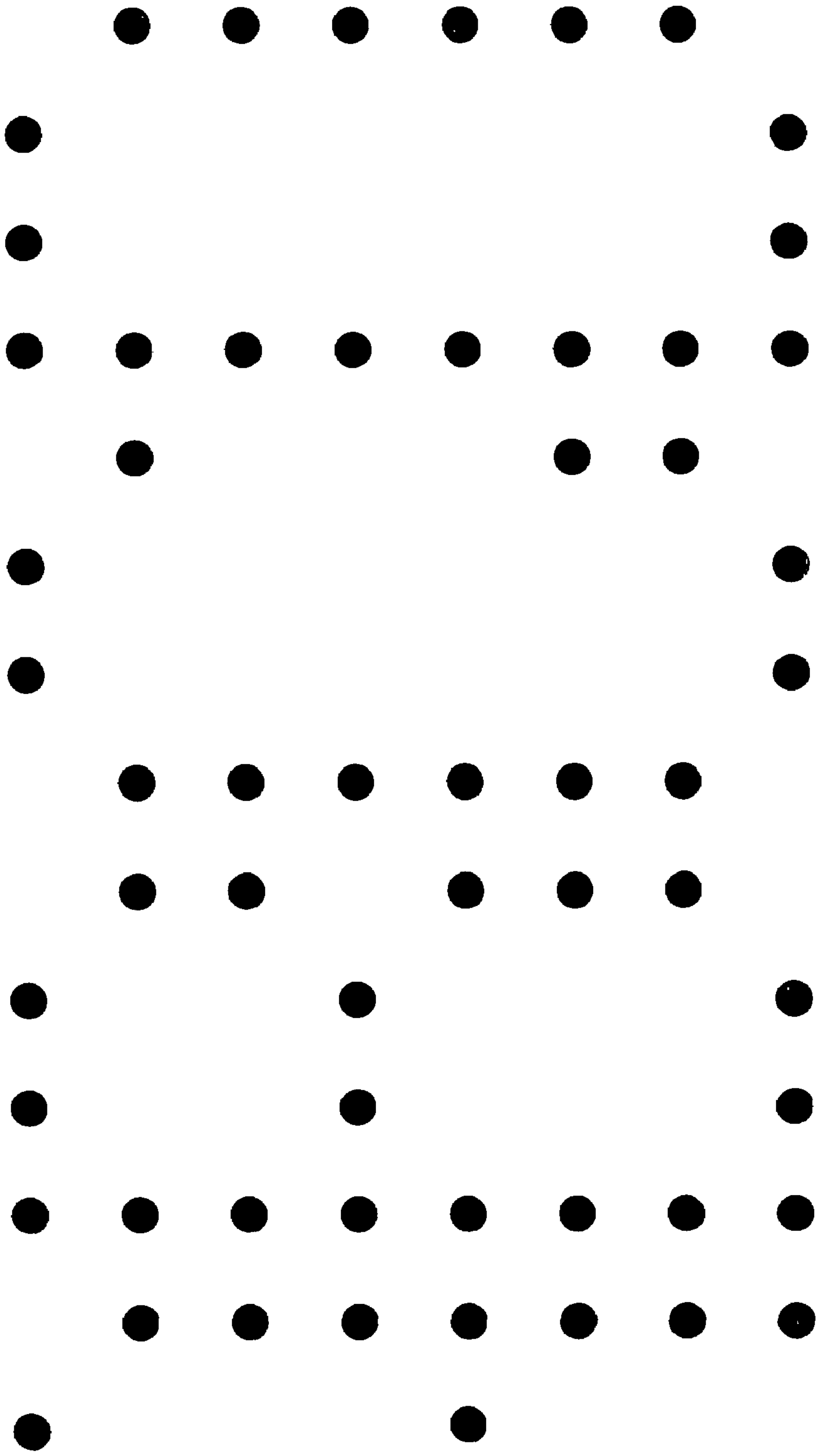
FIG. 4 is a schematic illustration that shows a simple example of both an image of a portion of an indicium that may be printed by the apparatus of FIG. 1 and a source image bit map for the printed image.

FIG. 4 shows an example of an image printed with an H1V1 resolution characteristic. For the purposes of FIG. 4 and the other images shown in FIGS. 6, 8 and 10, it is assumed that the images occupy a field that is 32 pixels across and 16 pixels high. In practice, the indicium or indicium portion that is printed in accordance with varying resolution characteristics may be larger or smaller than a field of this kind. Also, contrary to the examples shown in FIGS. 4, 6, 8 and 10, in practice the pixels may be so small as not to be visible except with the use of an optical magnification system.

In some embodiments, the image shown in FIG. 4 may be generated on the basis of a bit map which is also 32×16 pixels and which may be identical to the resulting image shown in FIG. 4.

Figure 5:
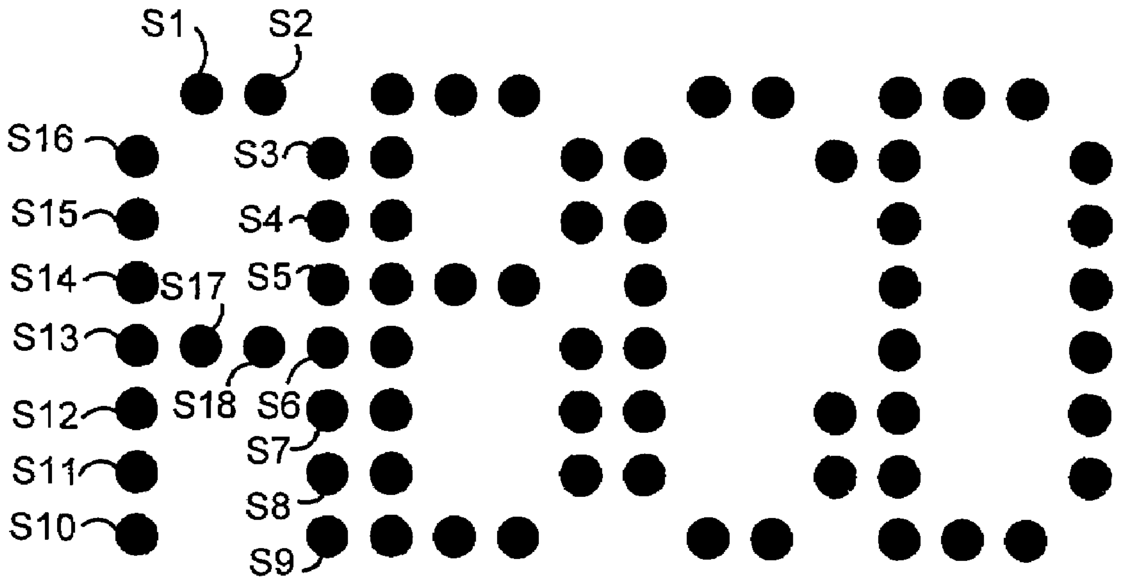
FIG. 5 is a schematic illustration that shows a simple example of another source bit map suitable for producing an image having a different resolution from the image of FIG. 4.
Figure 6:
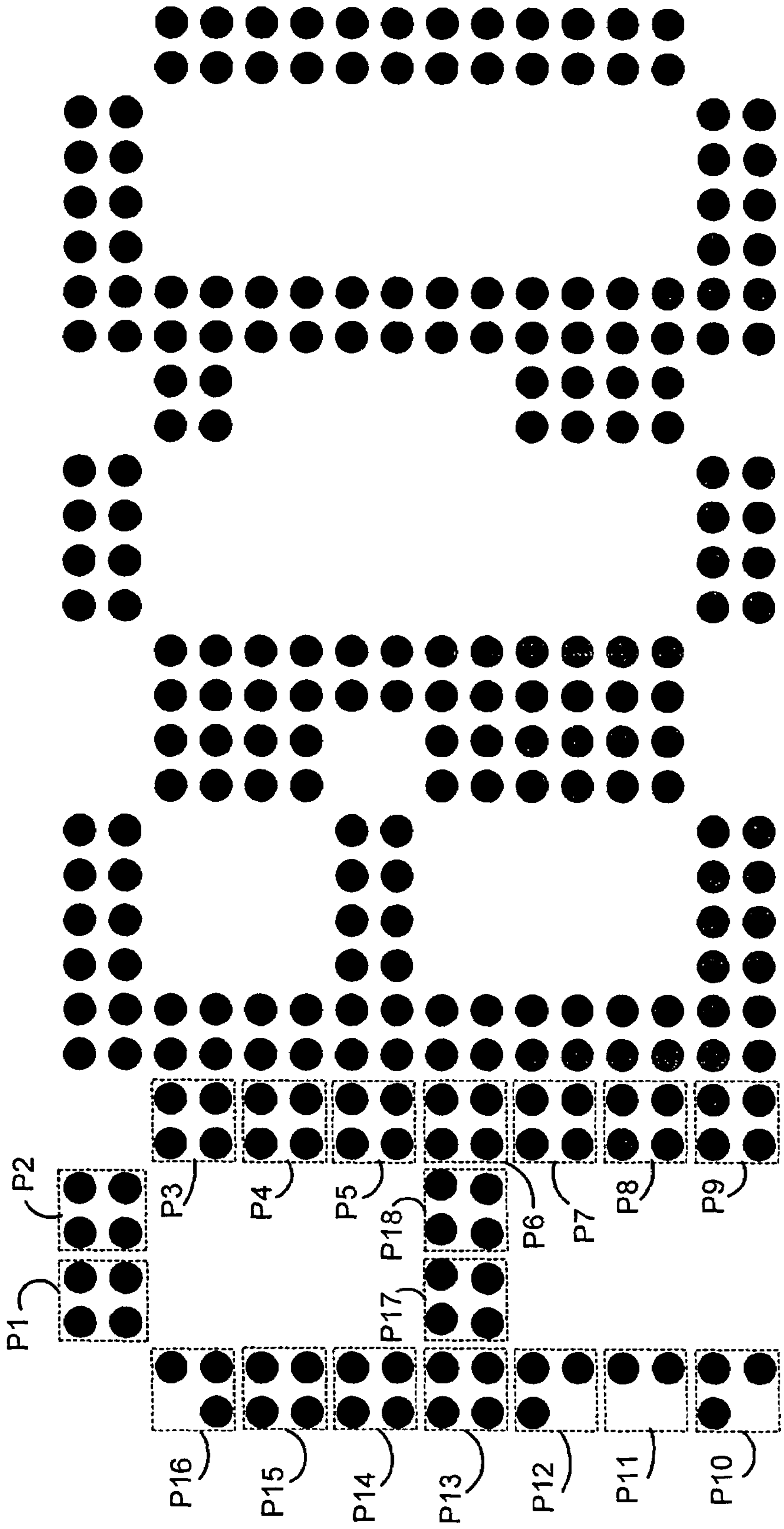
FIG. 6 is a schematic illustration that shows an image produced on the basis of the bit map of FIG. 5.

FIG. 5 shows an example of a source image bit map that may be used to generate a printed image in accordance with an H2V2 resolution characteristic. The source image bit map of FIG. 5 is 16×8 pixels. FIG. 6 shows an example 32×16 image generated from the source image bit map of FIG. 5 with an H2V2 resolution characteristic. The image of FIG. 6 is generated from the source image bit map of FIG. 5 by transforming each pixel of the source image bit map of FIG. 5 into a 2×2 array of corresponding pixels. For example, pixels S1 and S2 of the source image bit map of FIG. 5 are transformed to pixel groups P1 and P2, respectively, of the printed image of FIG. 6. The remaining pixels, S3-S16 of the source image bit map are likewise transformed to a corresponding pixel group P3-P16 in the printed image. Thus, each source pixel is transformed into four printed pixels, two in the horizontal direction and two in the vertical direction (H2V2).

Figure 7:
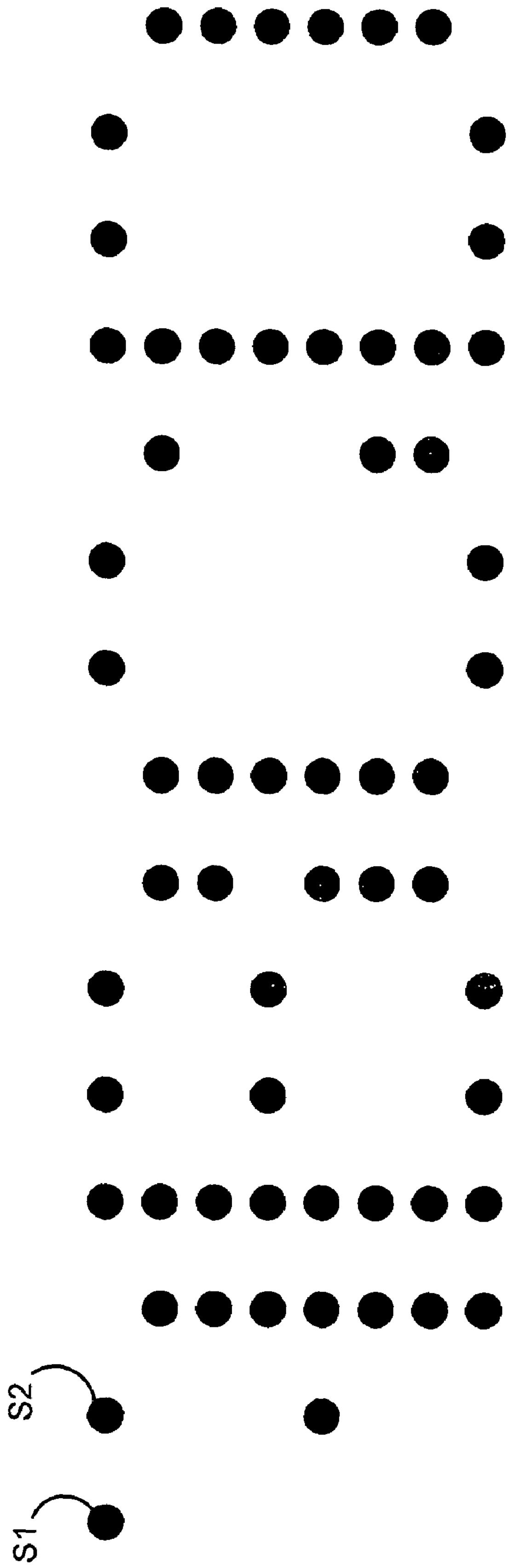
FIG. 7 is a schematic illustration that shows a simple example of still another source bit map suitable for producing an image having a different resolution from the images of FIGS. 4 and 6.
Figure 8:
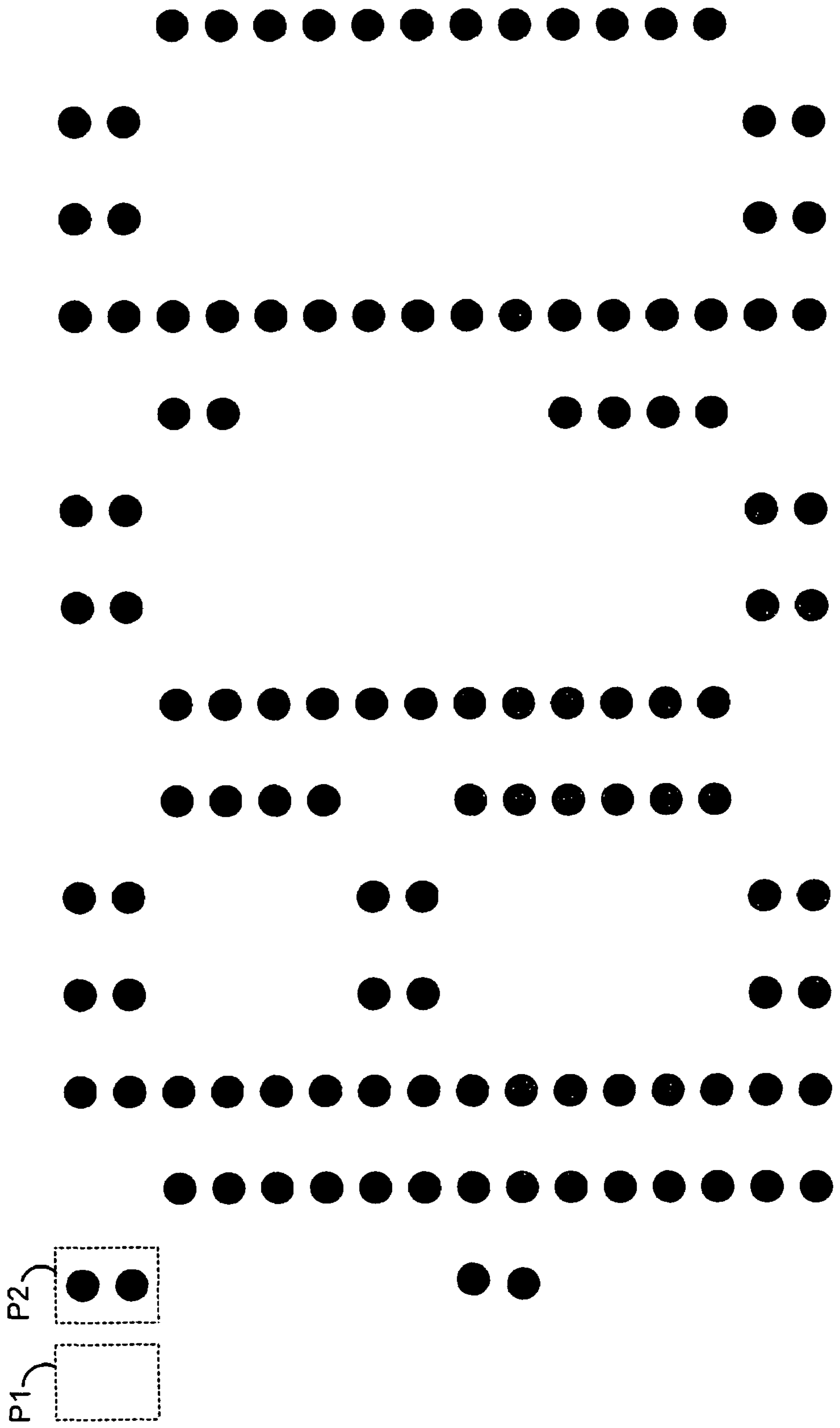
FIG. 8 is a schematic illustration that shows an image produced on the basis of the bit map of FIG. 7.

FIG. 7 shows an example of a source image bit map that can be used to print an image with an H1V2 resolution characteristic. The source image bit map of FIG. 7 is 32×8 pixels. FIG. 8 shows an example 32×16 image generated from the source image bit map of FIG. 7 with an H1V2 resolution characteristic. The image of FIG. 8 is generated from the source image bit map of FIG. 7 by transforming each pixel of the source image bit map of FIG. 7 into a 1×2 array of corresponding pixels. For example, pixels S1 and S2 of the source image bit map of FIG. 7 are transformed to pixel groups P1 and P2, respectively, of the printed image of FIG. 8. The remaining pixels of the source image bit map are likewise transformed to a corresponding pixel group in the printed image. Thus, each source pixel is transformed into two printed pixels in only the vertical direction (H1V2).

Figure 9:
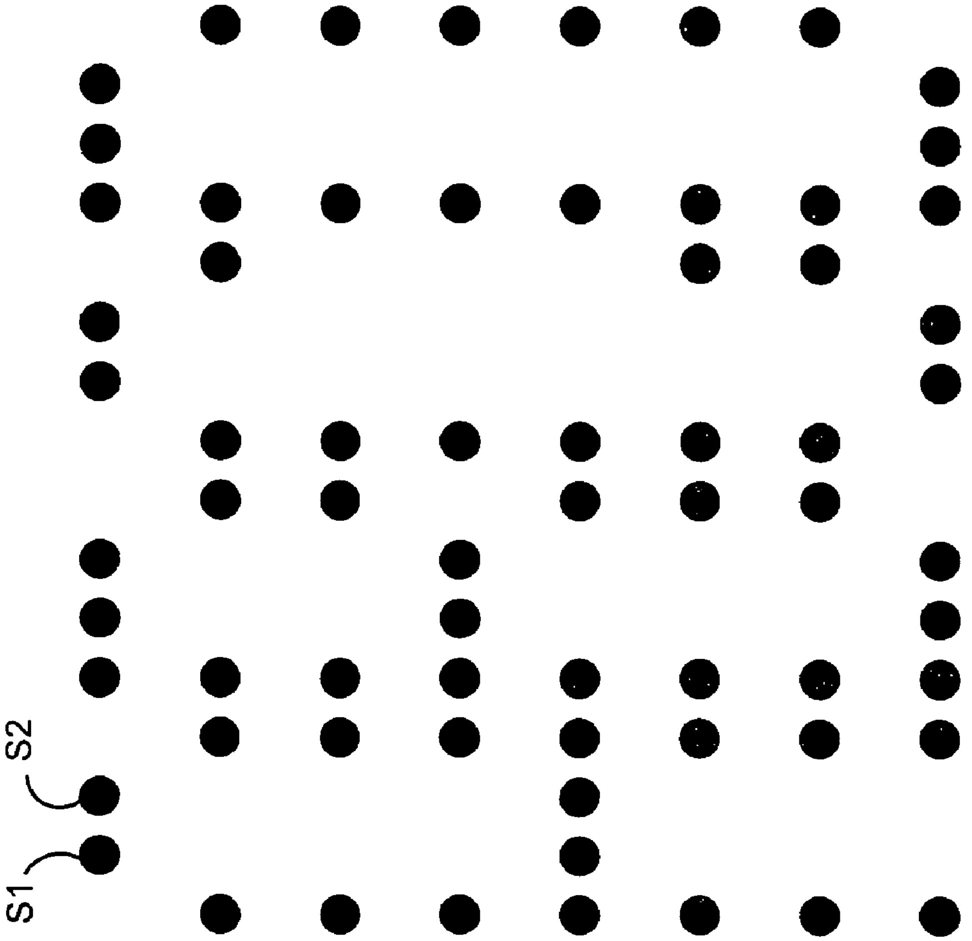
FIG. 9 is a schematic illustration that shows a simple example of yet another source bit map suitable for producing an image having a different resolution from the images of FIGS. 4, 6 and 8.
Figure 10:
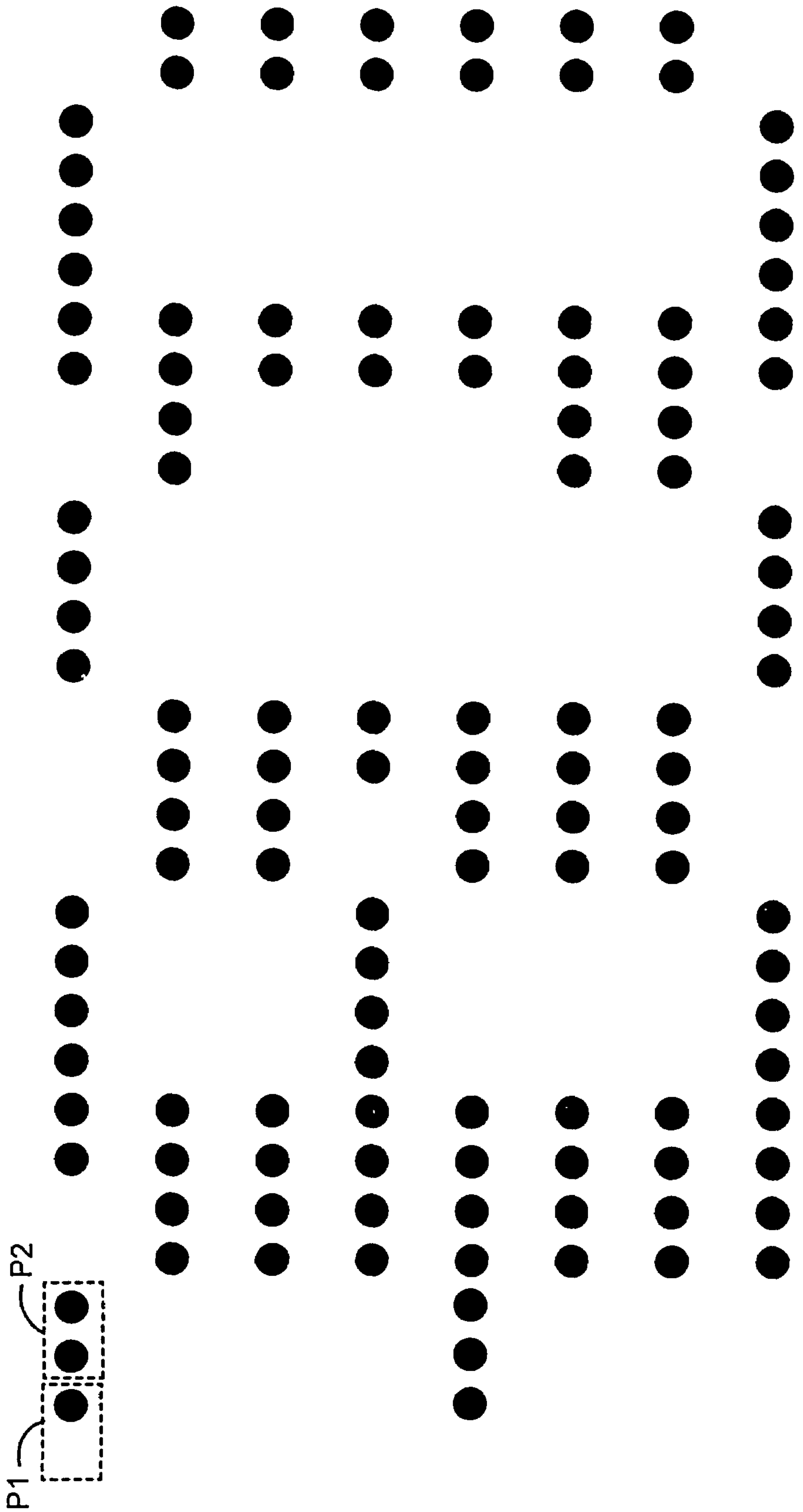
FIG. 10 is a schematic illustration that shows an image produced on the basis of the bit map of FIG. 9.

FIG. 9 shows an example of a source image bit map that can be used to print an image with an H2V1 resolution characteristic. The source image bit map of FIG. 9 is 16×16 pixels. FIG. 10 shows an example 32×16 image generated from the source image bit map of FIG. 9 with an H2V1 resolution characteristic. The image of FIG. 10 is generated from the source image bit map of FIG. 9 by transforming each pixel of the bit map of FIG. 9 into a 2×1 array of corresponding pixels. For example, pixels S1 and S2 of the source image bit map of FIG. 9 are transformed to pixel groups P1 and P2, respectively, of the printed image of FIG. 10. The remaining pixels of the source image bit map are likewise transformed to a corresponding pixel group in the printed image. Thus, each source pixel is transformed into two printed pixels in only the horizontal direction (H2V1).

The images of FIGS. 4, 6, 8 and 10, taken together, schematically illustrate how, at least under optical magnification, it is possible to determine by examination of an indicium or indicium portion what resolution characteristic was employed to print the indicium or indicium portion. In some embodiments, variations in the resolution characteristic may not be detectable with the naked eye.

In some embodiments, it may be preferable not to vary the resolution employed to print the barcode 70, in the event that varying the resolution employed to print the barcode 70 may interfere with machine reading of the data contained in the barcode. In some embodiments, some or all of a graphical image portion of the indicium (e.g., the icon 66, FIG. 3) may be the portion of the indicium for which varying resolution may be employed. In addition or alternatively, some or all of the alphanumeric characters of the indicium may be subject to printing with a varying resolution.

Figure 11:
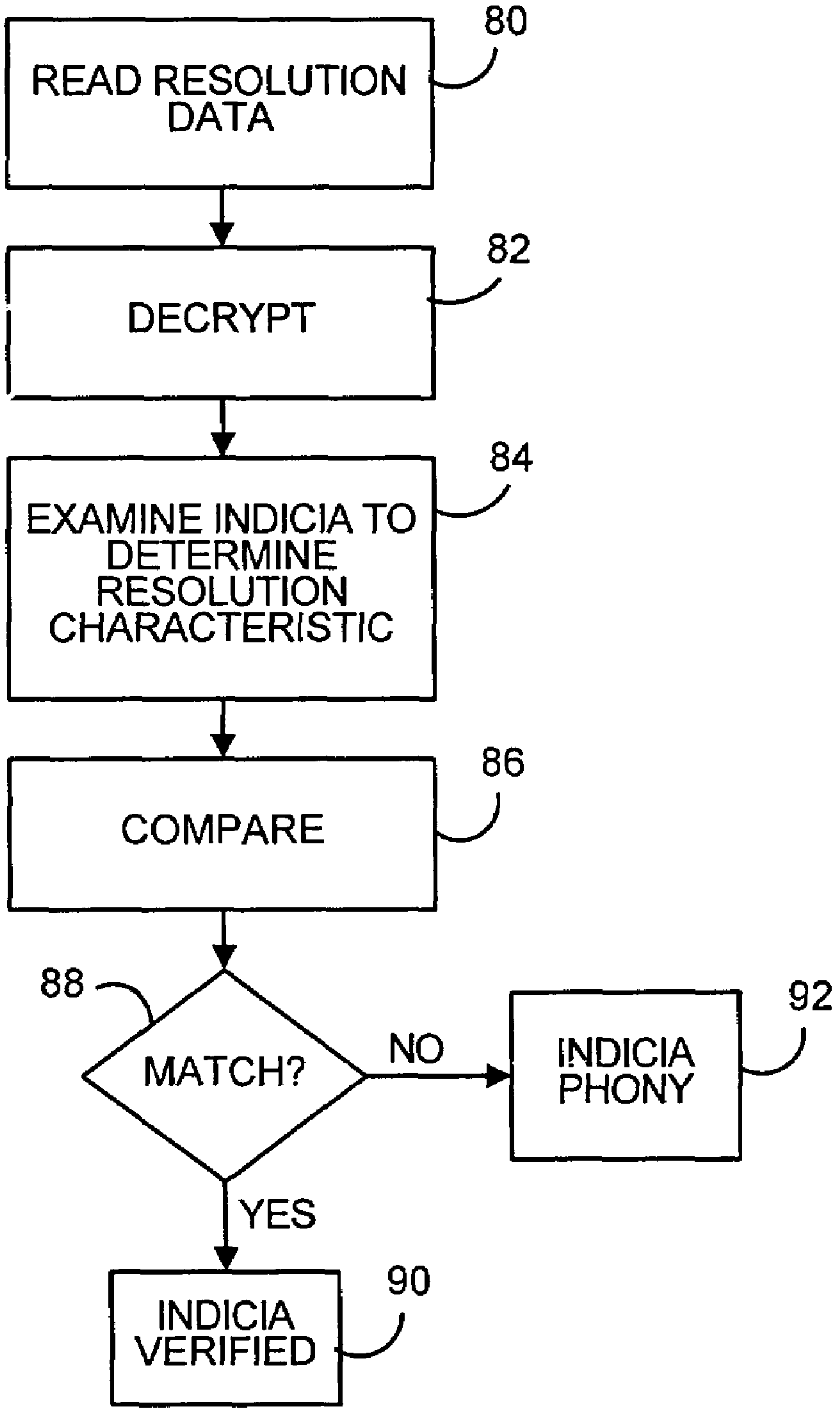
FIG. 11 is a flow chart that illustrates a process that may be performed to verify postage indicia printed by the apparatus of FIG. 1.

An operation to verify an indicium printed by the postage indicia printing apparatus 20 will now be described with reference to the flow chart shown in FIG. 11. The process of FIG. 11 begins with a step 80 at which a barcode reader (not shown) reads the barcode 70 of the indicium. Next, at step 82, the resolution characteristic data included in the barcode is decrypted (by, e.g., a computer (not shown) to which the barcode reader is coupled). Before, during or after steps 80 and 82, the indicium or a certain portion thereof is examined (by, e.g., using an optical magnification system) to determine the resolution characteristic in accordance with which the indicium or indicium portion was printed. This step is indicated at 84 in FIG. 11.

Next, at step 86, the resolution characteristic detected at step 84 is compared with the resolution characteristic read from the barcode and decrypted by the barcode reader/computer at steps 80, 82. For example, the barcode reader/computer may provide output to indicate the resolution characteristic represented by data in the barcode.

A decision block 88 may follow or form part of step 86. At decision block 88, it is determined whether the two resolution characteristics match. If so, the indicium can be considered verified (step 90). If the two resolution characteristics are determined not to match, the indicium may be found to be counterfeit (step 92).

In some embodiments, one or both of the resolution characteristics may be checked with data stored in an indicia verification data center to confirm that the resolution characteristic complies with instructions or requirements to determine the appropriate resolution characteristic for the indicium under examination.

With a system as described herein, including printing of resolution characteristic data in a postage indicium, and examination of the indicium to determine whether the indicium or a portion thereof has been printed in accordance with a resolution characteristic that matches the resolution characteristic data, verification of postage indicia can be facilitated, and counterfeiting of postage indicia can be more easily detected and deterred.

In addition to verifying indicia based on resolution characteristics determined by examination and stored as data in the indicia, other procedures may also be employed to verify the authenticity of the indicia.

In some embodiments, there may be two or more portions of the indicium for which the resolution characteristic may be changed from indicium to indicium, and the barcode may include resolution characteristic data corresponding to each of those indicium portions.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of indicia other than postage indicia. Other variations relating to implementation of the functions described herein can also be implemented. Accordingly, other embodiments are within the scope of the following claims.

What is claimed is:

1. A method for printing an indicium comprising:

selecting a print resolution characteristic for at least a portion of the indicium;

transforming a source image of the at least a portion of the indicium based on the selected print resolution characteristic; and printing the indicium on a substrate, the least a portion of the indicium being printed based on the transformed source image, the indicium including at least one symbol, the at least one symbol including resolution data that is indicative of the selected print resolution characteristic.

2. The method according to claim 1, wherein selecting a print resolution characteristic includes selecting a horizontal resolution factor and a vertical resolution factor.

3. The method according to claim 1, wherein the resolution data is in encrypted form.

4. The method according to claim 1, wherein the at least one symbol is part of a barcode.

5. The method according to claim 1, wherein the print resolution characteristic is randomly selected.

6. The method according to claim 1, wherein the print resolution characteristic is selected based on predetermined data.

7. A method for verifying authenticity of an indicium comprising:

examining the indicium to determine a print resolution characteristic used to print at least a portion of the indicium;

extracting at least one symbol included in the indicium, the at least one symbol specifying an actual print resolution characteristic that should have been used to print the at least a portion of the indicium; and comparing the determined print resolution characteristic with the actual print resolution characteristic to determine whether the determined print resolution characteristic matches the actual print resolution characteristic;

wherein if the determined print resolution characteristic matches the actual print resolution characteristic, the indicium is verified as authentic.

8. The method according to claim 7, wherein extracting at least one symbol includes reading a barcode that is part of the indicia.

9. The method according to claim 8, wherein the barcode is a two-dimensional barcode.

10. The method according to claim 7, wherein the indicium is a postage indicium.

11. The method according to claim 7, wherein the at least one symbol is encrypted, the method further comprising:

decrypting the at least one symbol.

12. A method of printing a postage indicium using a postage meter, the method comprising:

selecting a print resolution characteristic for at least a portion of the postage indicium based on predetermined data;

transforming a source image of the at least a portion of the postage indicium based on the selected print resolution characteristic; and printing the postage indicium, the at least a portion of the postage indicium being printed based on the transformed source image, the postage indicium including data that indicates the selected print resolution characteristic.

13. The method according to claim 12, wherein the predetermined data includes at least one of a calendar date, a current day of the week, a state or province in which the postage meter is located, a postal zone in which the postage meter is located, a current value of a register of the postage meter, and a random process.

14. The method according to claim 12, wherein the data is in the form of a barcode that is part of the postage indicia.

15. A postage meter comprising:

means for selecting a print resolution characteristic for at least a portion of a postage indicium;

means for transforming a source image of the at least a portion of the postage indicium based on the selected print resolution characteristic; and print means, responsive to the means for transforming, for printing the postage indicium, the at least a portion of the postage indicium being printed based on the transformed source image, the postage indicium including data that indicates the selected print resolution characteristic.

16. The postage meter according to claim 15, wherein the data is in the form of a barcode that is part of the postage indicium.

17. The postage meter according to claim 15, wherein the print resolution characteristic includes a horizontal resolution factor and a vertical resolution factor.

18. The postage meter according to claim 15, wherein the print resolution characteristic is selected based on at least one of: (a) a calendar date, (b) a current day of the week, (c) a state or province in which the postage meter is located, (d) a postal zone in which the postage meter is located, (e) a current value of a register of the postage meter, and (f) a random process.

* * * * *